J. SLOMER.
EXPANSION JOINT OR COUPLING.
APPLICATION FILED MAY 2, 1919.
1,369,198.
Patented Feb. 22, 1921.
2 SHEETS—SHEET 1.
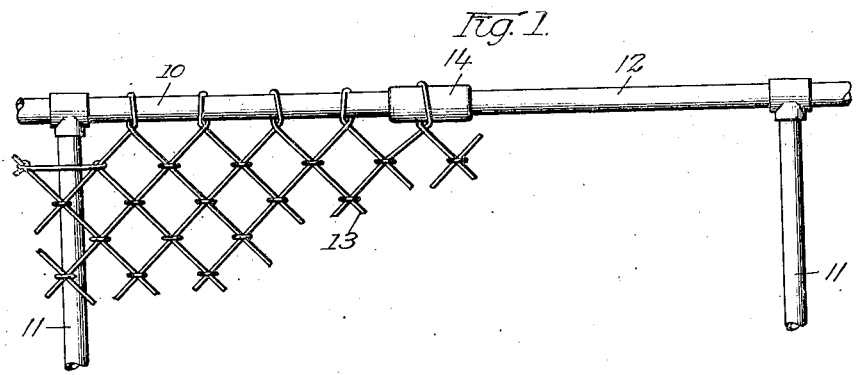
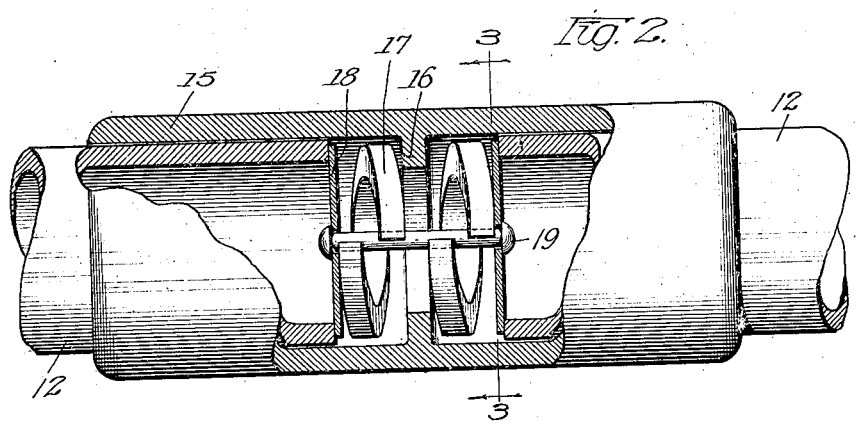
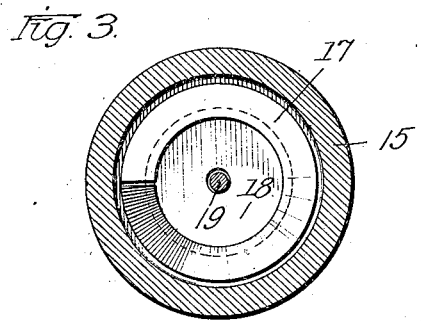
Inventor
Joseph Slomer J. SLOMER.
EXPANSION JOINT OR COUPLING.
APPLICATION FILED MAY 2, 1919.
1,369,198.
Patented Feb. 22, 1921.
2 SHEETS—SHEET 2.
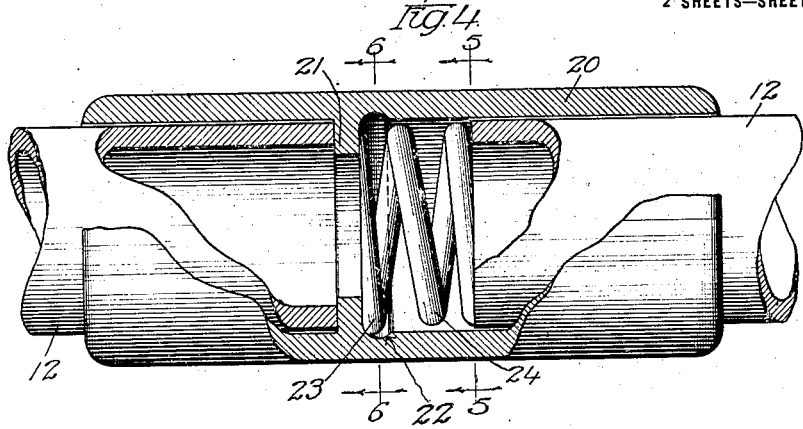
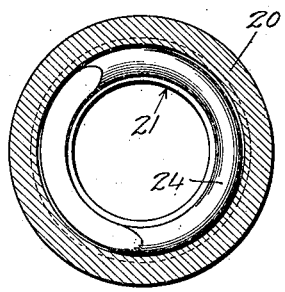
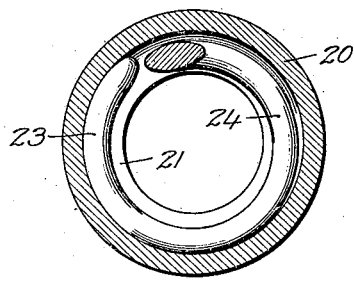
Inventor
Joseph Slomer
Jones Rain & Bean
Attys.

UNITED STATES PATENT OFFICE.

JOSEPH SLOMER, OF WAUKEGAN, ILLINOIS, ASSIGNOR TO CYCLONE FENCE COMPANY, OF WAUKEGAN, ILLINOIS, A CORPORATION OF ILLINOIS.

EXPANSION JOINT OR COUPLING.

1,369,198.  Specification of Letters Patent.  Patented Feb. 22, 1921.

Application filed May 2, 1919. Serial No. 294,244.

*To all whom it may concern:*

Be it known that I, JOSEPH SLOMER, a citizen of the United States, residing at Waukegan, in the county of Lake and State of Illinois, have invented certain new and useful Improvements in Expansion Joints or Couplings, of which the following is a specification.

This invention relates to improvements in expansion joints or couplings for use particularly in connection with metal fences, partitions, hand railings, and the like.

The principal object of this invention is the provision of a coupling including resilient means located between the ends of the sections of metal pipes, or rods, so as to permit the expansion and contraction of the metal pipes, or rods, due to changes in temperature and climatic conditions without undue pressure and end thrust which would result in buckling or bending of these parts.

A further object of this invention is to provide a suitable joint, or coupling of this character, which will automatically adjust itself properly in relation to the parts or sections to be coupled.

A further object of this invention is the provision of a joint or coupling of this character which may be quickly and readily applied and then securely held in proper position to function according to its purpose.

Other objects of this invention include improvements in details of construction and arrangement whereby a simple and effective device of this character is provided.

To the accomplishment of the foregoing and such other objects as may hereinafter appear, my invention consists in the construction, combination and arrangement of parts hereinafter described and then sought to be defined in the appended claims, reference being had to the accompanying drawings forming a part hereof, which show merely for the purpose of illustrative disclosure two embodiments of my invention, it being expressly understood, however, that various changes may be made in practice within the scope of the claims without digressing from my inventive idea.

In the drawings—

Figure 1 represents an elevation of part of a fence structure showing the aforesaid expansion joint or coupling in use.

Fig. 2 is an enlarged elevational view of the joint or coupling, parts being shown in longitudinal cross section to facilitate the disclosure.

Fig. 3 is a vertical transverse section taken substantially on line 3—3 of Fig. 2.

Fig. 4 is an elevational view of a joint or coupling constructed in a somewhat different manner from that shown in Fig. 2 of the drawings, parts of this figure being shown in vertical longitudinal section to facilitate the disclosure.

Fig. 5 is a vertical transverse section taken substantially on line 5—5 of Fig. 4.

Fig. 6 is a vertical transverse section taken substantially on line 6—6 of Fig. 4.

Referring now to the drawings the numeral 10 designates a general fencing structure which includes the vertical posts or uprights 11 and the horizontal and longitudinally extending top rails, stringers or the like 12. By these parts the fence fabric 13 is supported which may be secured thereto in any desired manner. The top members or rails 12 are usually formed in sections, securely connected together at their ends or may be formed of a continuous piece secured to the vertical members 11 at suitable intervals. In such constructions it is manifest that due to the expansion and contraction of the metal, under temperature variations and climatic changes, that the line will bend or buckle, resulting in distortion of the fence structure and possible breaking down thereof. It is to prevent this that I provide the expansion joint and coupling which is indicated generally by the reference character 14 in Fig. 1 of the drawings.

Referring first to Figs. 2 and 3, it is seen that this coupling includes the elongated sleeve part 15, the internal diameter of which is somewhat greater than the external diameter of the pipes or rods 12 to be coupled. This sleeve 15 is formed at an intermediate point with the annular flange 16, which forms a shoulder or abutment. Positioned within the sleeve are the coiled or spiral springs 17, one being positioned on each side of said flange or abutment 16. These springs 17, are held in place by means of the disks or washers 18 which are connected together by means of the headed pin or rivet 19. It is seen that when the coupling is in use the ends of the adjacent pipes or rods bear against the disks or washers 18 and that the springs 17 will yield when the rods or pipes 12 expand under increase in temperature, it being recalled that the sleeve 15 permits movement therein of the rods or pipes 12. It is therefore evident that the expansion and contraction of the pipes or rods 12, is permitted and without damage to the structure and the sections thereof are held in proper alinement at all times.

A slightly different embodiment of this invention is shown in Figs. 4, 5 and 6 of the drawings. In these figures, the numeral 12 designates the pipe or rod, the ends of which are adapted to be connected, and 20 designates the coupling sleeve. This sleeve is also provided with the inwardly converging annular flange forming a shoulder or abutment 21, against which is adapted to engage the end of one of the sections of rod or pipe 12, this being shown to the left in Fig. 4. On the other side of the shoulder or abutment 21 I provide a circular groove 22, which is adapted to receive the end coil 23 of the coil spring 24, it being understood that the end convolution, as shown particularly in Fig. 6, of the drawings, is of a greater diameter than the remaining convolutions of the spring so that the same may be forced into and resiliently held in locking position within the groove 22. The other end of the coil spring is in position to engage the end of the other section of rod or pipe 12, so as to permit its movement within the sleeve 20 under the influence of expansion and contraction, due to change of temperature and climatic conditions. It is seen, therefore, that this construction functions the same as the other construction, but that it is merely a slightly different means of carrying this idea into practical effect.

Having described my invention, what I claim is:—

1. A device of the character described including in combination, a member adapted to receive the adjacent ends of a pair of pipes or rods, the same being in spaced relation to each other, an abutment provided on said member and a groove provided adjacent said abutment, a coil spring having one convolution adapted to fit in said groove, the other end thereof being adapted to engage the end of one of said pipes or rods whereby the same may expand and contract relative to the other pipe or rod and may move relative to said member.

2. A device of the character described including in combination a sleeve adapted to receive the adjacent ends of a pair of pipes or rods, the ends of said pipes or rods being normally in spaced relation, said sleeve having an internal shoulder or abutment against which the end of one of said pipes or rods engages, said sleeve also having a groove provided therein adjacent said abutment, a coiled spring having one end convolution of greater diameter than the other convolutions and fitting in said groove, said coiled spring engaging the end of the other of said rods or pipes whereby it may expand and contract with reference to the first mentioned rod or pipe and may move relative to said sleeve.

3. A pipe connecting sleeve having an internal flange or abutment; a spring on each side of the abutment and means extending on each side of the abutment connecting the springs together.

In testimony whereof I hereunto subscribe my name.

JOSEPH SLOMER.